United States Patent

Fukaya et al.

Patent Number: 5,107,413
Date of Patent: Apr. 21, 1992

[54] METHOD WHEREBY NUMERICAL CONTROL INFORMATION PREPARING FUNCTION DETERMINES MANNER OF MACHINING

[75] Inventors: Yasushi Fukaya; Akira Hibi, both of Ooguchi, Japan

[73] Assignee: Kabushiki Kaisha Okuma Tekkosho, Aichi, Japan

[21] Appl. No.: 436,794

[22] Filed: Nov. 15, 1989

[30] Foreign Application Priority Data

Nov. 15, 1988 [JP] Japan .................. 63-287906

[51] Int. Cl.$^5$ ............................................ G05B 19/42
[52] U.S. Cl. .................. 364/191; 364/474.34; 364/474.15; 364/474.2
[58] Field of Search ............... 364/191, 474.2, 474.15, 364/474.25, 474.34, 474.29

[56] References Cited

U.S. PATENT DOCUMENTS

| | | | |
|---|---|---|---|
| 4,445,182 | 4/1984 | Morita et al. | 364/474.25 |
| 4,513,366 | 4/1985 | Munekata et al. | 364/191 |
| 4,722,045 | 1/1988 | Kishi et al. | 364/474.25 |
| 4,739,488 | 4/1988 | Asakura | 364/474.25 |
| 4,818,925 | 4/1989 | Lahm et al. | 364/474.34 |

Primary Examiner—Dale M. Shaw
Assistant Examiner—Laura Brutman
Attorney, Agent, or Firm—Wenderoth, Lind & Ponack

[57] ABSTRACT

A method whereby the numerical control information preparing function determines the manner of machining. On the basis of the input shape of a workpiece and on the basis of the input shape of a component part to be obtained from the workpiece, a portion of the workpiece which is to be subjected to outer diameter machining and a portion of the same which is to be subjected to inner diameter machining are determined. Thereafter, a division candidate point is obtained so that each of the portions may be divided, at the division candidate point, into a sub-portion to be subjected to forward cutting and a sub-portion to be subjected to backward cutting. On the basis of the configuration of the backward cutting sub-portion and the shape of the tool to be used, a check is made as to whether any part of the sub-portion can remain uncut after the backward cutting. On the basis of the result of this check, a determination is made as to whether the entire portion should be divided at the division candidate point. If the division is determined, the portion is divided into the forward cutting sub-portion and the backward cutting sub-portion, with the division candidate point serving as the boundary. Thus, each of the outer diameter machining portion and the inner diameter machining portion can be divided into a forward cutting sub-portion and a backward cutting sub-portion at the optimum point.

12 Claims, 10 Drawing Sheets

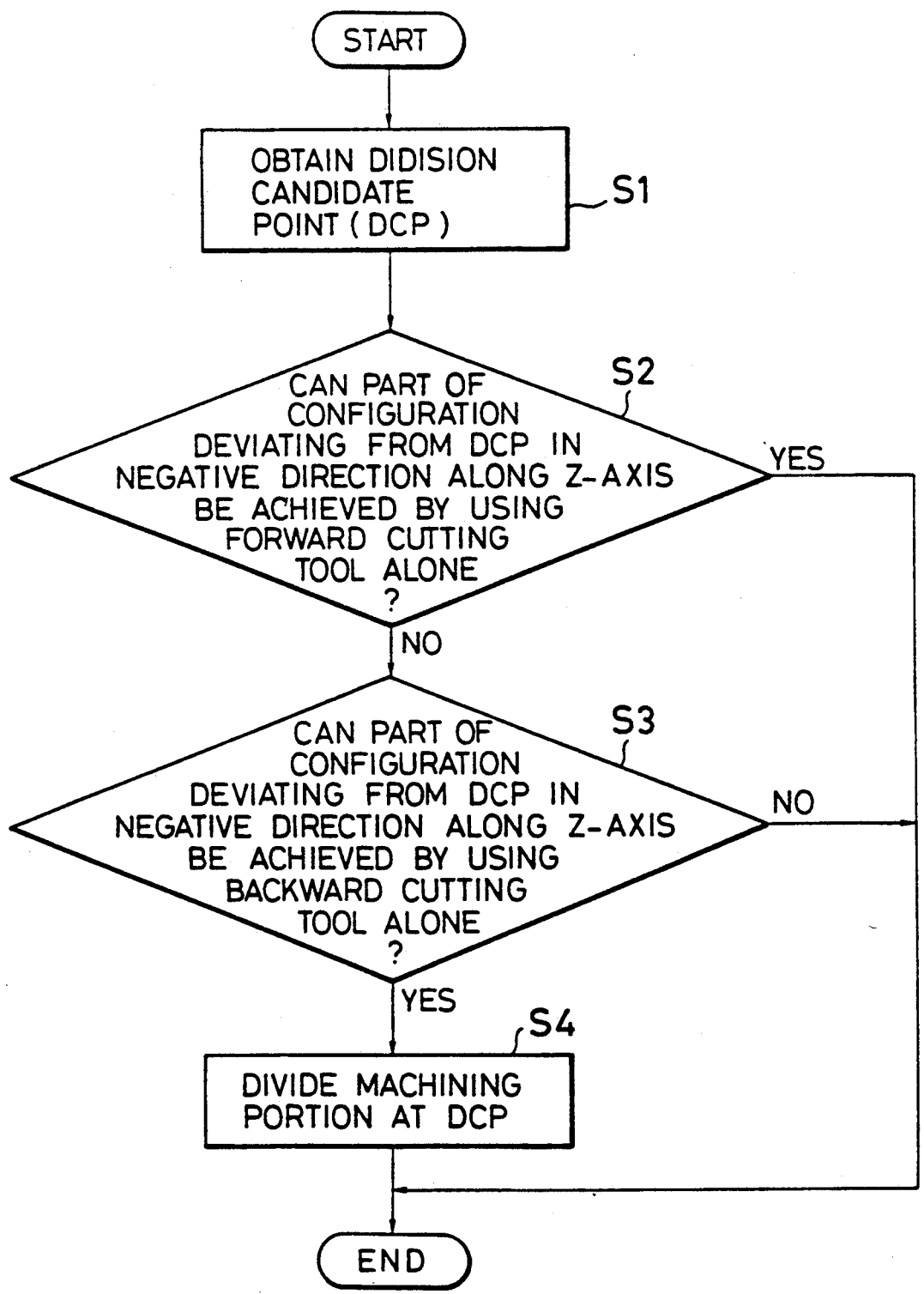
F I G. 8

METHOD WHEREBY NUMERICAL CONTROL INFORMATION PREPARING FUNCTION DETERMINES MANNER OF MACHINING

BACKGROUND OF THE INVENTION

The present invention relates to a method whereby the manner in which a work is to be machined is determined by the function of preparing numerical control information.

Referring to FIG. 1, a description will be given of a conventional method whereby the manner of machining is determined by the numerical control information preparing function.

In an apparatus to which the conventional method is applied, data denoting the shape of work to be machined and data denoting the shape of a component part into which the work is to be machined are inputted through a keyboard 1 to a work shape storing section 2 and a component part shape storing section 3, respectively. Also, data denoting the shape of various tools which may be used in the machining process such as data denoting the tool angle and the cutting angle, is inputted to a tool shape registering section 6. Similarly, data denoting various machining sequences and data denoting various machining conditions are inputted through the keyboard 1 to a machining sequence registering section 8 and a machining condition registering section 10, respectively.

A machining portion determining section 4 determines the portion of the work which should be machined, by reading the data denoting the work shape and the data denoting the component part shape from the work shape storing section 2 and the component part shape storing section 3, respectively. Data denoting a target configuration WS into which the determined machining portion should be machined is sent to a cutting direction determining section 5 as well as to a machining procedure registering section 12. The cutting direction determining section 5 determines, on the basis of the target configuration WS of the to be machined portion of the work, the direction CD in which cutting should be performed. Data denoting the determined cutting direction CD is sent to a tool determining section 7 and the machining procedure registering section 12. The tool determining section 7 determines, as the tool to be used, a tool that conforms with the cutting direction CD and the work machining portion target configuration WS that has been read from the machining procedure registering section 12, by selecting a tool shape, from among various tool shapes registered in the section 6. Data denoting the determined tool DT to be used is sent to the machining procedure registering section 12. When the tool to be used has been thus selected and determined by the tool determining section 7, if the selected tool shape is such that any part of the work portion that should be machined will remain uncut, this possibility is posted to a remaining uncut part determining section 14.

In this case, the remaining uncut part determining section 14 reads, from the machining procedure registering section 12, the work machining portion target configuration of part of the to be machined portion of the work which will remain uncut after machining, and changes the work machining portion target configuration into a configuration in which the work machining portion can be machined without any uncut portion remaining after machining. The section 14 sends data on the corrected target configuration of the work machining portion to the machining procedure registering section 12. The section 14 also operates to determine the target configuration into which the part remaining uncut after the first machining process should be further machined, and then sends data denoting the determined target configuration to the machining procedure registering section 12 as well as to the cutting direction determining section 5. With respect to the part remaining uncut after the first machining process, the cutting direction determining section 5 and the tool determining section 7 perform operations similar to those described above, that is, they respectively determine the cutting direction and the tool to be used to machine the remaining uncut portion.

A machining sequence determining section 9 reads, from the machining procedure registering section 12, the data denoting the target configuration WS of the machining portion, the cutting direction CD, and the tool DT to be used, these data being already registered. On the basis of the read data, the section 9 determines the sequence WR to be followed during machining, in accordance with data registered in the machining sequence registering section 8. The determined machining sequence WR is sent to a cutting condition determining section 11 and the machining procedure registering section 12. The cutting condition determining section 11 determines the cutting conditions to be adopted during machining in accordance with data registered in the cutting condition registering section 10, and on the basis of the data denoting the target configuration WS of the machining portion, the cutting direction CD, the tool DT to be used, and the machining sequence WR read from the machining procedure registering section 12 in which such data is already registered. The determined cutting conditions are sent to the machining procedure registering section 12 and are then registered therein. Finally, a numerical control information preparing section 13 prepares numerical control information NCF in accordance with the above-described data registered in the machining procedure registering section 12.

As an example, a case will be described in which the apparatus shown in FIG. 1 is used to obtain a component part having the shape indicated by the solid line shown in FIG. 2 from a workpiece having the shape indicated by the broken line shown in FIG. 2. A determination is made by the machining portion determining section 4 as to the target configuration into which the outer diameter of a portion of the work should be machined, specifically, the configuration defined by the lines or configuration constituents $l_1$, $l_2$, $l_3$, $l_4$, $l_5$, $l_6$, $l_7$, $l_8$ and $l_9$ shown in FIG. 2. The cutting direction is determined, by the cutting direction determining section 5, to be the forward direction, as indicated by the arrow shown in FIG. 3 (the hatching indicates the part to be machined in the forward cutting direction). Further, the tool to be used is determined by the tool determining section 7. Thereafter, the machining sequence and the cutting conditions are determined, thereby allowing the preparation of numerical control information NCF.

Another case will be described, in which a component part having the shape indicated by the solid line shown in FIG. 4 is to be obtained from a workpiece having the configuration indicated by the broken line shown in FIG. 4. A determination is made by the machining portion determining section 4 as to the target configuration that should be achieved in a portion of the work by subjecting the work to outer diameter machining, specifically, the configuration defined by the lines $l_1, l_2, l_3, l_4, l_5, l_6, l_7, l_8$ and $l_9$ shown in FIG. 4. The cutting direction is determined, by the cutting direction determining section 5, to be the forward direction, as indicated by the arrow shown in FIG. 5 (the hatched lines declining to the left indicating the part to be machined in the forward cutting direction). Further, the tool to be used is determined by the tool determining section 7. In this case, however, a part of the machining portion will remain uncut after the forward cutting machining, such as that indicated by the hatched lines declining to the right in FIG. 5. Therefore, a correction is performed by the remaining uncut part determining section 14 such that the target configuration that should be first achieved by the portion to be subjected to the outer diameter machining is determined to be the configuration defined by the lines $l_1, l_2, l_3, l_4, l_5, l_7''', l_7'', l_8$ and $l_9$, while the target configuration that should be achieved by the part remaining uncut after the first forward direction machining process is determined to be the configuration defined by the lines $l_7'$ and $l_6$. Furthermore, the cutting direction and the tool that are to be used in the machining of the remaining uncut part are determined by the sections 5 and 7, respectively.

With this method, however, the following problem arises. The constituent $l_7$ among the constituents defining the target configuration of the outer diameter machining portion is divided, at a point P, into the two subconstituents, i.e., $l_7''$ which is to be achieved by forward cutting, and $l_7'$ which is to be achieved by backward cutting. As a result, a mark will be formed at the dividing point P, and such a mark will remain after the completion of the machining.

In order to avoid this problem, when numerical control information NCF is to be prepared by normal manual mode, the conventional practice that has been generally adopted is to divide the entire outer diameter machining portion into sub-portions at a point $P_0$, as shown in FIG. 6. This allows the configuration constituents $l_1, l_2, l_3, l_4$ and $l_5$ to be achieved by machining in the forward direction, whereas the configuration constituents $l_9, l_8, l_7$ and $l_6$ to be achieved by machining in the backward direction. However, this conventional practice also necessitates one constituent of the configuration to be divided in the middle, thereby resulting in the preparation of numerical control information that can adversely affect the machined surface.

As described above, the conventional method has been such that a portion of work which is to be subjected to outer diameter machining as well as a portion of the work which is to be subjected to inner diameter machining are determined on the basis of the inputted data denoting the shape of the workpiece and denoting the shape of the component part to be obtained, the cutting direction to be used in the machining process is always determined to be the forward direction relative to each of the machining portions, and the tool to be used is determined on the basis of the target configuration of each machining portion and on the basis of the cutting direction. Then, a check is made, on the basis of the target configuration of each machining portion, the cutting direction, and the shape of the tool to be used, whether cutting is possible without involving any interference of the tool with the configuration of each machining portion, a new route is created if such interference is possible, and, finally, a part remaining uncut after the completion of the machining performed in the above-described manner is removed by performing machining in the backward direction. However, the conventional method always necessitated one constituent of the target configuration corresponding to the component part shape to be divided, in the middle thereof, into a sub-portion to be subjected to forward cutting and a sub-portion to be subjected to backward cutting. This has lead to adverse influences on the machined surface.

SUMMARY OF THE INVENTION

The present invention has been accomplished in view of the above-described circumstances. It is an object of the present invention to provide a method whereby the numerical control information preparing function determines the manner of machining, the method being directed to the overcoming of the problems of the prior art, and being capable of allowing each of an outer diameter machining portion and an inner diameter machining portion to be divided, at the optimum point, into a sub-portion to be subjected to forward direction cutting and a sub-portion to be subjected to backward direction cutting.

According to one aspect of the present invention, for achieving the objects described above, there is provided a method whereby the numerical control information preparing function determines the manner of machining, comprising the steps of: causing the numerical control information preparing function to determine, on the basis of the input shape of a workpiece and on the basis of the input shape of a component part to be obtained from said workpiece, a portion of said workpiece which is to be subjected to outer diameter machining and a portion of said workpiece which is to be subjected to inner diameter machining, and causing the numerical control information preparing function to automatically divide, on the basis of the target configuration into which each of said portion to be subjected to said outer diameter machining and said portion to be subjected to inner diameter machining should be machined, each of said portions into a sub-portion to be subjected to forward direction cutting and a sub-portion to be subjected to backward direction cutting.

The nature, principle and utility of the invention will become more apparent from the following detailed description when read in conjunction with the accompanying drawings.

BRIEF DESCRIPTION OF THE DRAWINGS

In the accompanying drawings:

FIG. 8 is a flow chart showing an example of the operation of the apparatus shown in FIG. 7;

DESCRIPTION OF THE PREFERRED EMBODIMENTS

Figure 1:
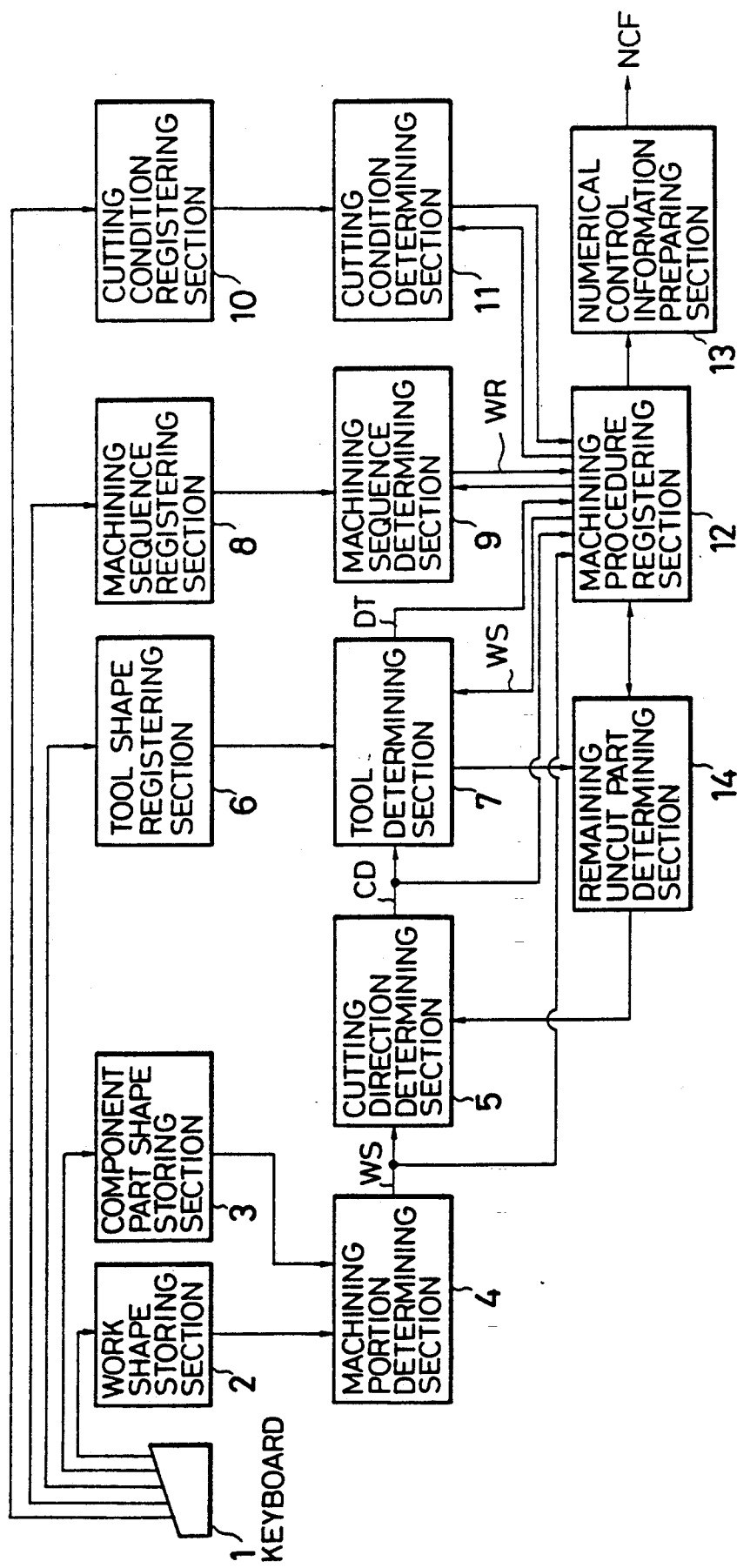
FIG. 1 is a block diagram showing the construction of an apparatus to which the conventional method is applied.
Figure 7:
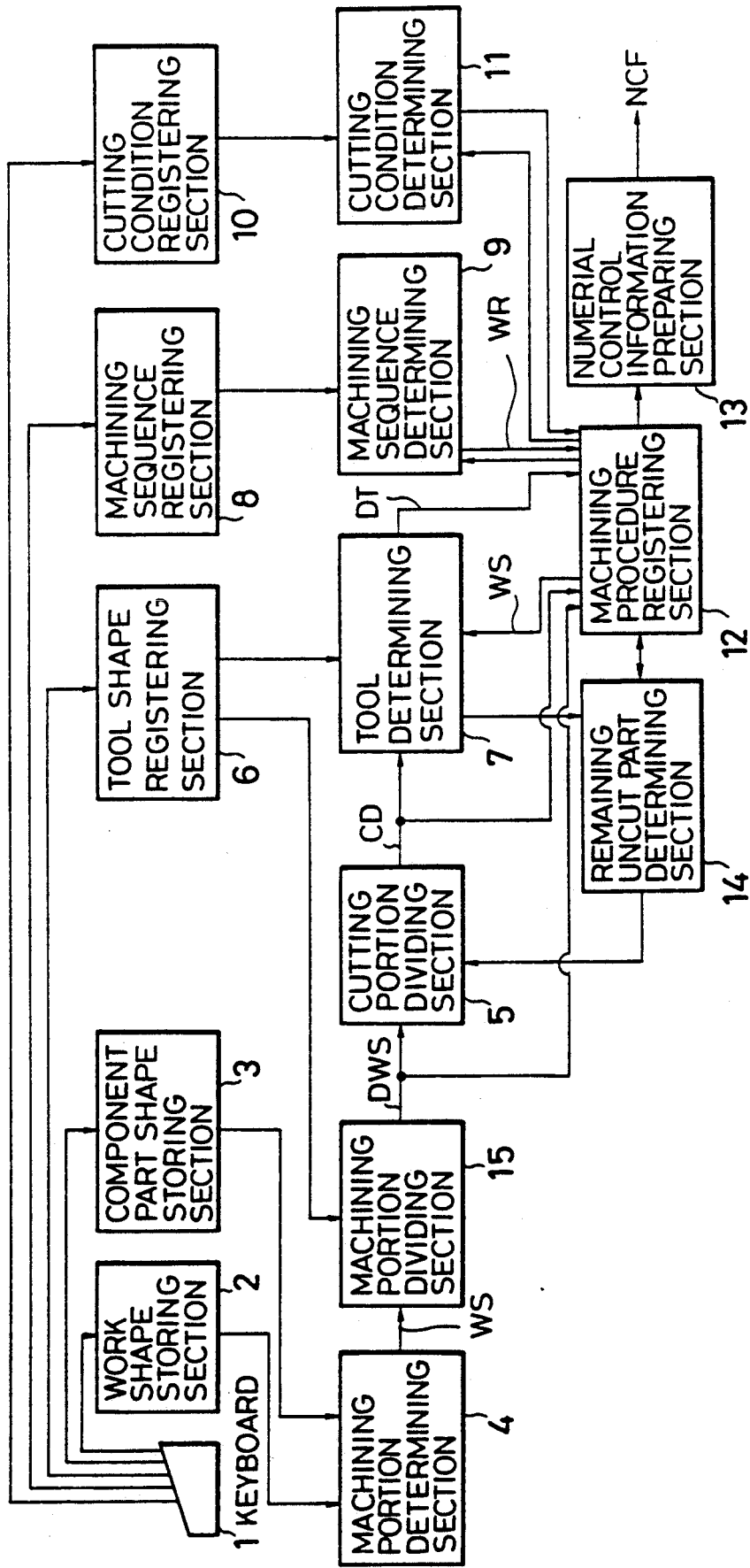
FIG. 7 is a block diagram showing the construction of an example of an apparatus to which the method according to the present invention is applicable.

A method of determining the manner of machining in accordance with the present invention will be described with reference to the block diagram shown in FIG. 7 in which various blocks are shown in correspondence with those shown in FIG. 1.

Figure 4:
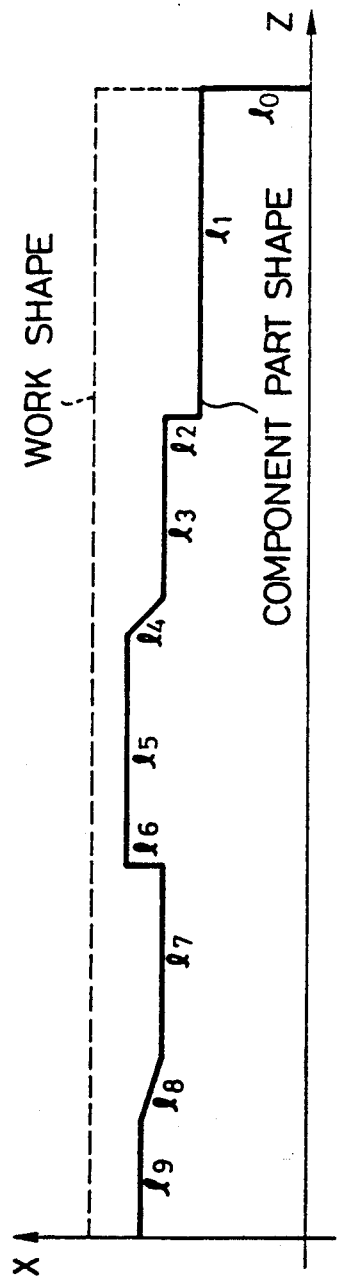

A machining portion determining section 4 of an apparatus to which the present invention is applicable determines, on the basis of data denoting the shape of a component part to be obtained as indicated by the solid line shown in FIG. 4, the target configuration WS into which the outer diameter of a portion of a workpiece should be machined, i.e., the configuration defined by the configuration constituents $l_1, l_2, l_3, l_4, l_5, l_6, l_7, l_8$ and $l_9$ shown in FIG. 4. The determined target configuration WS of the outer diameter machining portion is sent to a machining portion dividing section 15. The associated tool shape registering section 6 allows for the registration of various tool shapes. If, on the basis of the determined target configuration WS of the outer diameter machining portion and on the basis of tool shapes registered in the tool shape registering section 6, it is necessary to divide the portion to be subjected to outer diameter machining, the machining portion dividing section 15 divides the outer diameter machining portion into a sub-portion which is to be subjected to forward direction cutting and a sub-portion which is to be subjected to backward direction cutting. The section 15 then sends the target configuration DWS of each of the sub-portions to the associated cutting direction determining section 5 and to the associated machining procedure registering section 12. On the other hand, if it is not necessary to so divide the outer diameter machining portion, the target configuration WS of the machining portion is sent to the sections 5 and 12, and the remainder of the operation being is the same as that in the prior art.

A description will now be given with respect to the operation of the machining portion dividing 15 which section is provided to effect the method according to the present invention, with reference to the flow chart shown in FIG. 8.

First, in Step S1, the machining portion dividing section 15 obtains a division candidate point (DCP) at which the machining portion may be divided, on the basis of the coordinates of the starting or terminating points of each of the configuration constituents constituting the target configuration WS of the machining portion. Specifically, from among the configuration constituent starting points, the point having the maximum X-coordinate and minimum Z-coordinate is selected. In the example shown in FIG. 6, the point P0 is obtained as the division candidate point.

Figure 2:
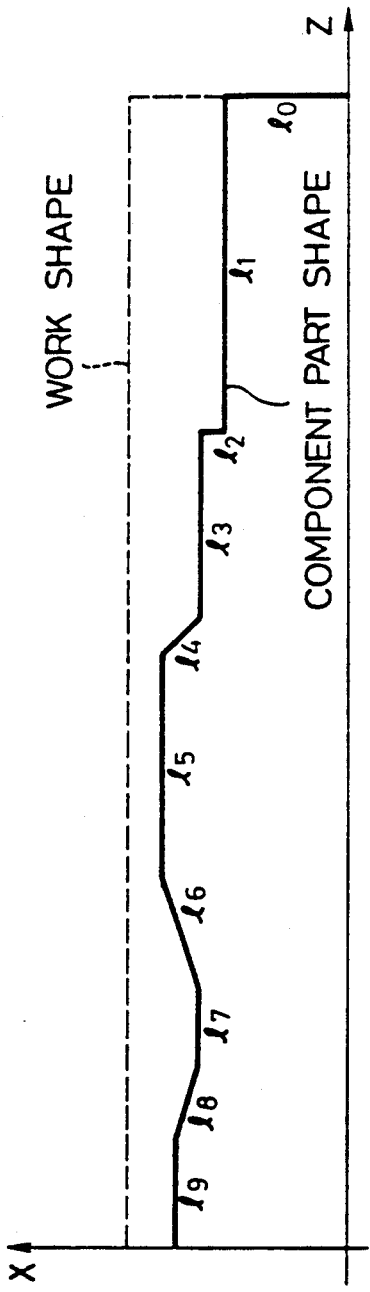
FIGS. 2 to 6 are views used to explain the operation of the apparatus.
Figure 3:
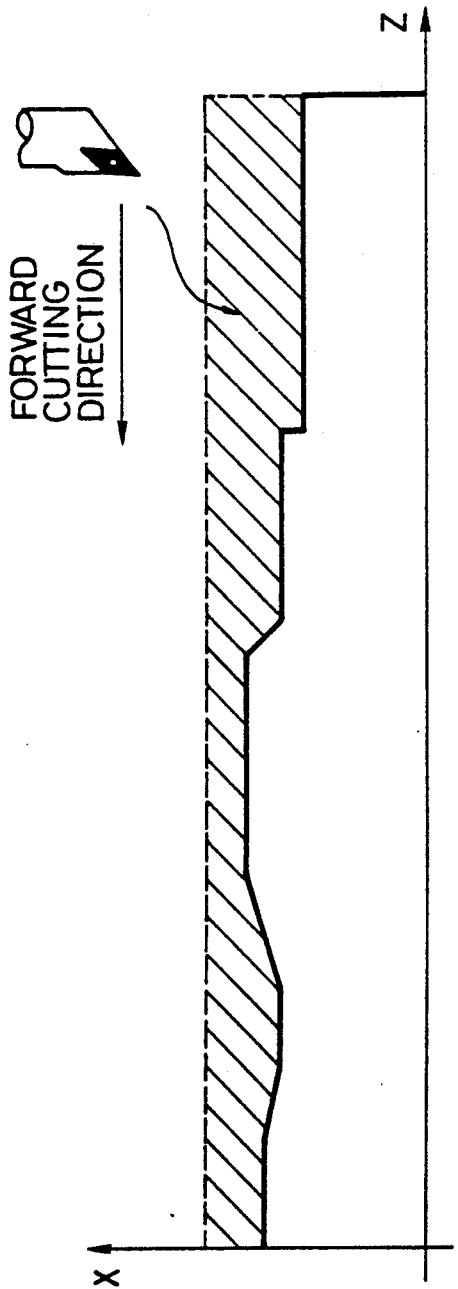
Figure 9:
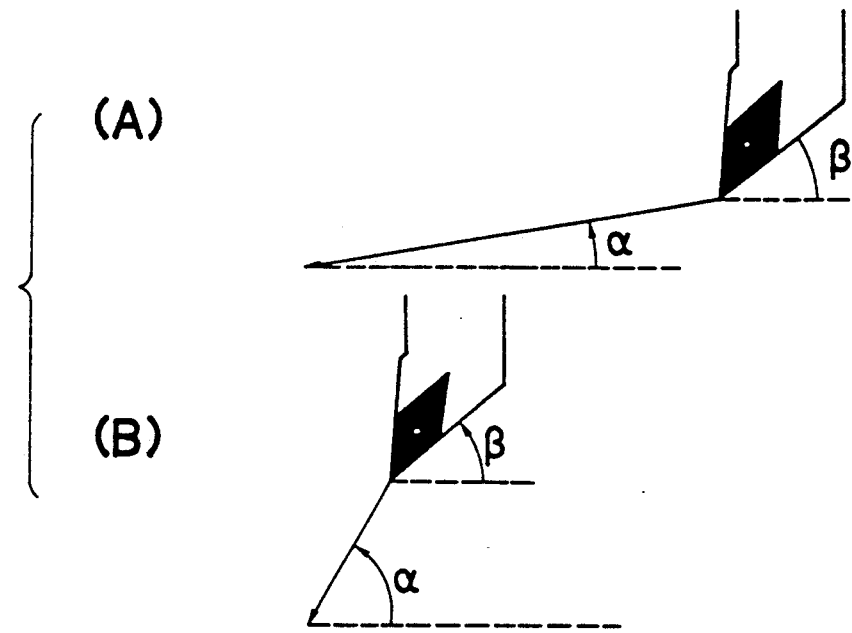
FIGS. 9 and 10 are views used to explain the principle of the method according to the present invention.

Subsequently, in the Step S2, a determination is made as to whether a certain part of the target configuration which is deviated from the obtained division candidate point in the negative direction along the Z-axis can be achieved by using a tool for forward direction cutting alone. Specifically, this determination is made by comparing the complementary angle $\beta$ of the tool angle with the tapering angle $\alpha$ of each configuration constituent declining from the division candidate point toward the negative direction along the Z-axis. If the relationship of $\alpha < \beta$ is satisfied, as shown in FIG. 9(A), the machining of that part of the target configuration by the use of the forward direction cutting tool alone is determined to be possible. On the other hand, if the relationship of $\alpha \geq \beta$ is satisfied, as shown in FIG. 9(B), the machining of the pertinent part of the target configuration using the forward direction cutting tool alone is determined to be impossible because the tip of the tool will interfere with this part of the configuration. If the check concerning the possibility of interference has resulted in the determination that the pertinent part of the target configuration is machinable using the forward direction cutting tool alone, it is not necessary to divide the outer diameter machining portion. For instance, in the case where the component part shape is that indicated by the solid line shown in FIG. 2, and where the point at the intersection of the configuration constituents $l_5$ and $l_6$ is obtained as the division candidate point, those configuration constituents $l_6, l_7, l_8$ and $l_9$ deviating from the division candidate point in the negative direction along the Z-axis are determined to be machinable using the forward cutting tool alone. In this case, therefore, the target configuration constituted by the constituents $l_1, l_2, l_3, l_4, l_5, l_6, l_7, l_8$ and $l_9$ is not divided into sub-portions.

Figure 6:
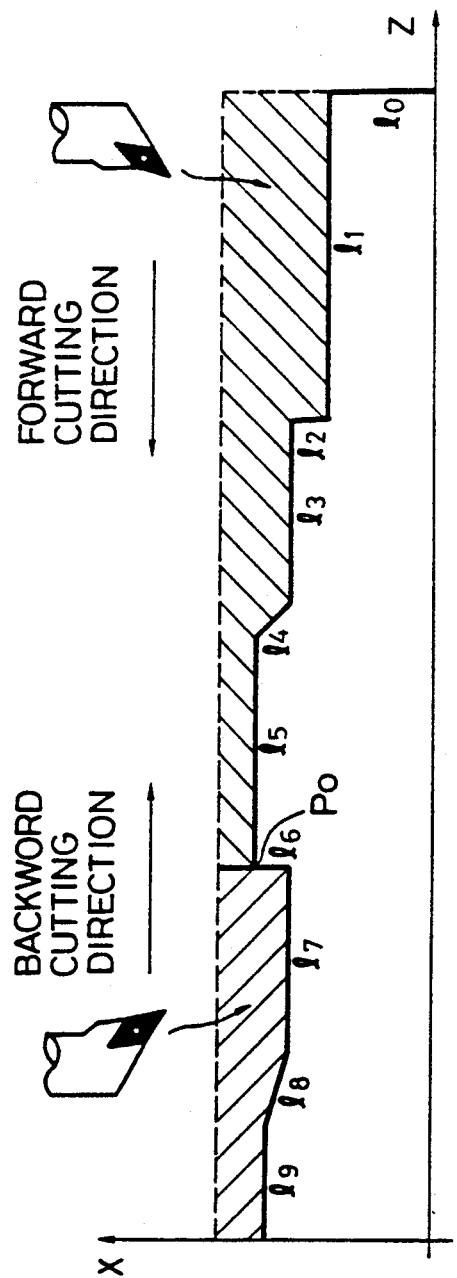
Figure 10:
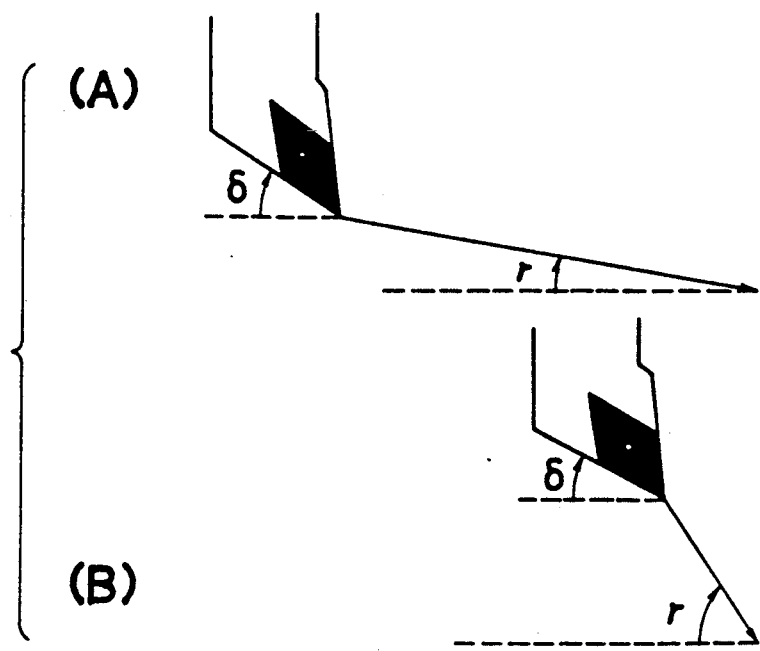

On the other hand, in the case where the component part shape is that as indicated by the solid line shown in FIG. 6, those configuration constituents $l_6, l_7, l_8$ and $l_9$ deviating from the division candidate point P0 in the negative direction along the Z-axis are determined to be unmachinable using the forward direction cutting tool alone. In this case, Step S3 is executed, in which another determination is made as to whether those configuration constituents can be machined using a tool for backward direction cutting alone. Specifically, this determination is made by comparing the complementary angle $\delta$ of the tool angle with the tapering angle $\gamma$ of each configuration constituent declining in the positive direction along the Z-axis from the configuration constituent whose starting or terminating point has the minimum Z-coordinate except for the DCP. If the relationship of $\gamma < \delta$ is satisfied, as shown in FIG. 10(A), the machining of the pertinent configuration constituents using the backward direction cutting tool alone is determined to be possible. On the other hand, if the relationship of $\gamma \geq \delta$ is satisfied, as shown in FIG. 10(B), the machining of the pertinent configuration constituents using the backward direction cutting tool alone is determined to be impossible because the tip of the tool will interfere with those configuration constituents.

If the check concerning the possibility of interference has resulted in the determination that the pertinent part of the target configuration is achievable by the backward cutting tool alone, then Step S4 is executed, in which the outer diameter machining portion is divided, by using the division candidate point, into a sub-portion to be subjected to forward direction cutting and a sub-portion to be subjected to backward direction cutting. For instance, in the case of the configuration constituents $l_6, l_7, l_8$ and $l_9$ shown in FIG. 6, when the complementary angle $\delta$ of the tool angle is compared with the tapering angle $\gamma$ of each configuration constituent declining in the positive direction along the Z-axis from the configuration constituent $l_9$ whose starting or terminating point has the minimum Z-coordinate except for the DCP, this comparison results in the determination that the pertinent configuration constituents can be achieve using the backward direction cutting tool alone, without any resulting interference. In this case, therefore, the target configuration of the outer machining portion which is constituted by the constituents $l_1$, $l_2, l_3, l_4, l_5, l_6, l_7, l_8$ and $l_9$ are divided, using the division candidate point P0 serving as the boundary, into the part consisting of the constituents $l_1, l_2, l_3, l_4$ and $l_5$ which is to be machined by forward direction cutting and the part consisting of the constituents $l_6, l_7, l_8$ and $l_9$ which is to be achieved by the backward direction cutting.

Figure 11:
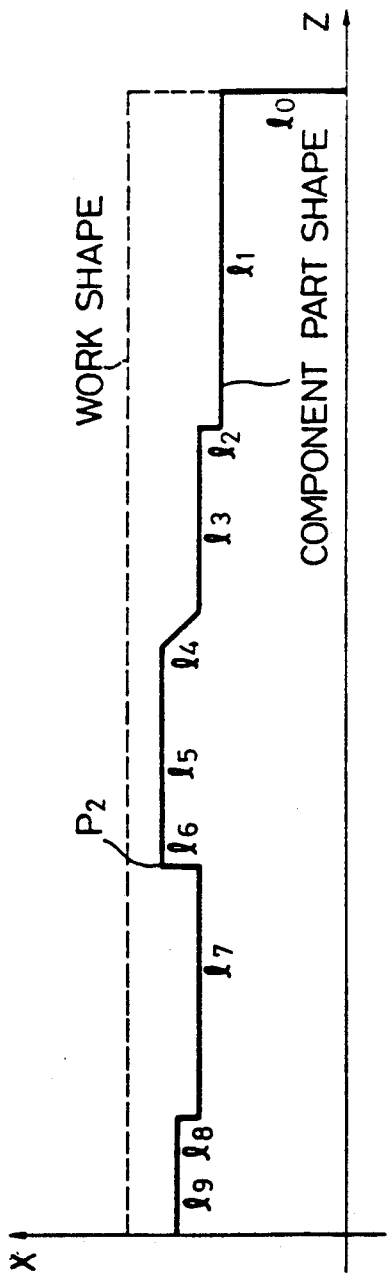
FIGS. 11 to 13 are views used to explain operations provided by the application of the method according to the present invention.
Figure 12:
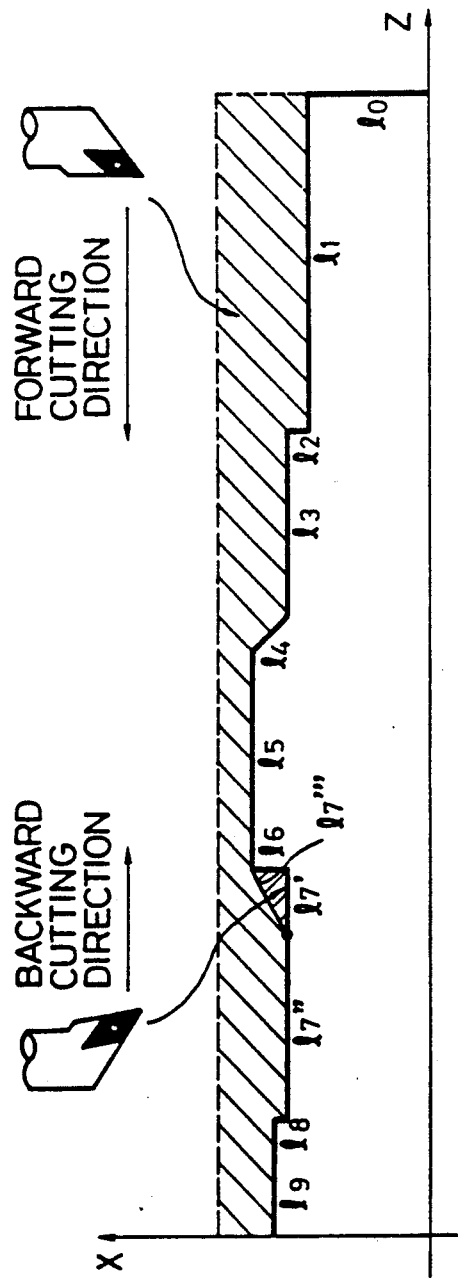

If, in the Step S3, the machining of the configuration constituents $l_6, l_7, l_8$ and $l_9$ using the backward direction cutting tool alone is also determined to be impossible, the division of the outer diameter machining portion is not effected. This is because the machining will result in part of the sub-portion remaining uncut regardless of the cutting tool, the forward direction cutting tool or the backward direction cutting tool, used to machine the part of the configuration which is deviated from the division candidate point in the negative direction along the Z-axis. For instance, in the case where the component part shape is that indicated by a solid line shown in FIG. 11, and where the division candidate point is the point P2 at the intersection of configuration constituents $l_5$ and $l_6$, the effort to machine those configuration constituents $l_6, l_7, l_8$ and $l_9$ deviating from the division candidate point P2 in the negative direction along the Z-axis cannot be made without resulting in part of the machining portion remaining uncut regardless of whether the tool used is the forward direction cutting tool or the backward direction cutting tool. In this case, therefore, the target configuration constituted by constituents $l_1, l_2, l_3, l_4, l_5, l_6, l_7, l_8$ and $l_9$ is not divided, and the portion is subjected to outer diameter machining in the manner illustrated in FIG. 12.

The operation provided by the machining portion dividing section 15 has been described above with reference to the flow chart shown in FIG. 8. The operation provided by other parts of the apparatus is exactly the same as that in the apparatus carrying out the conventional method.

Figure 13:
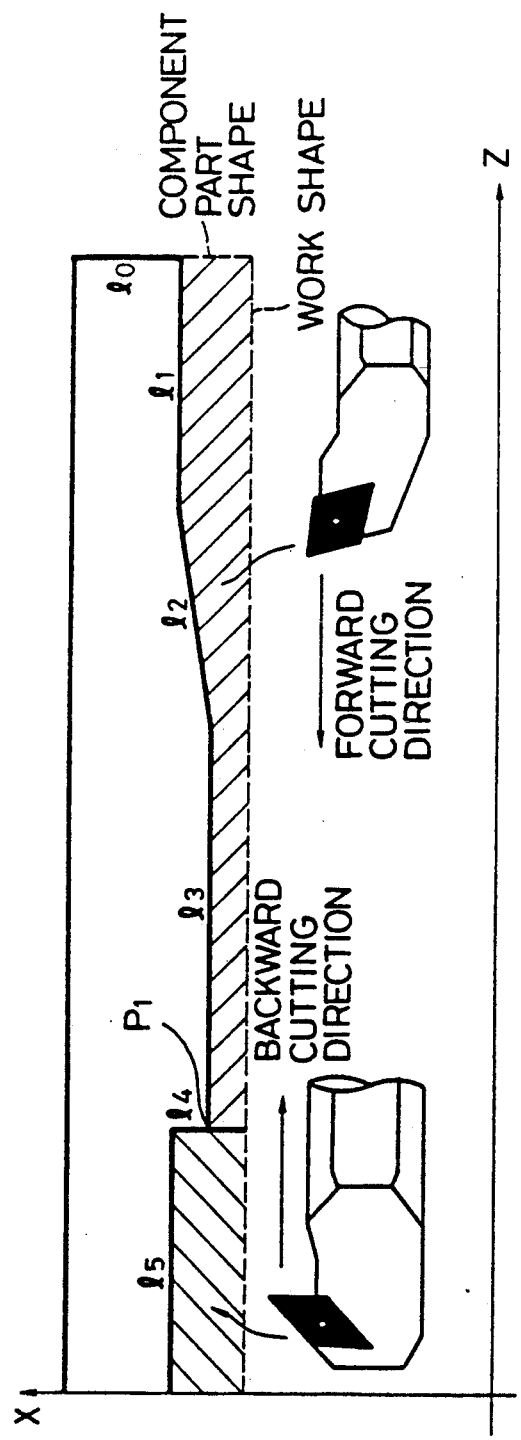

The description given above concerns the division of the outer diameter machining portion. However, this is considered an example, and the division of a portion to be subjected to inner diameter machining may be effected in a similar manner. A description will be given of the case where the component part shape is, e.g., that shown in FIG. 13. In this case, the target configuration of the inner diameter machining portion, which is constituted constituents $l_1, l_2, l_3, l_4$ and $l_5$, is divided, by using a division candidate point P1 as the boundary, into a part consisting of the constituents $l_1, l_2$ and $l_3$ which is to be achieved by forward direction cutting and the part consisting of the constituents $l_4$ and $l_5$ which is to be achieved by backward direction cutting.

Figure 14:
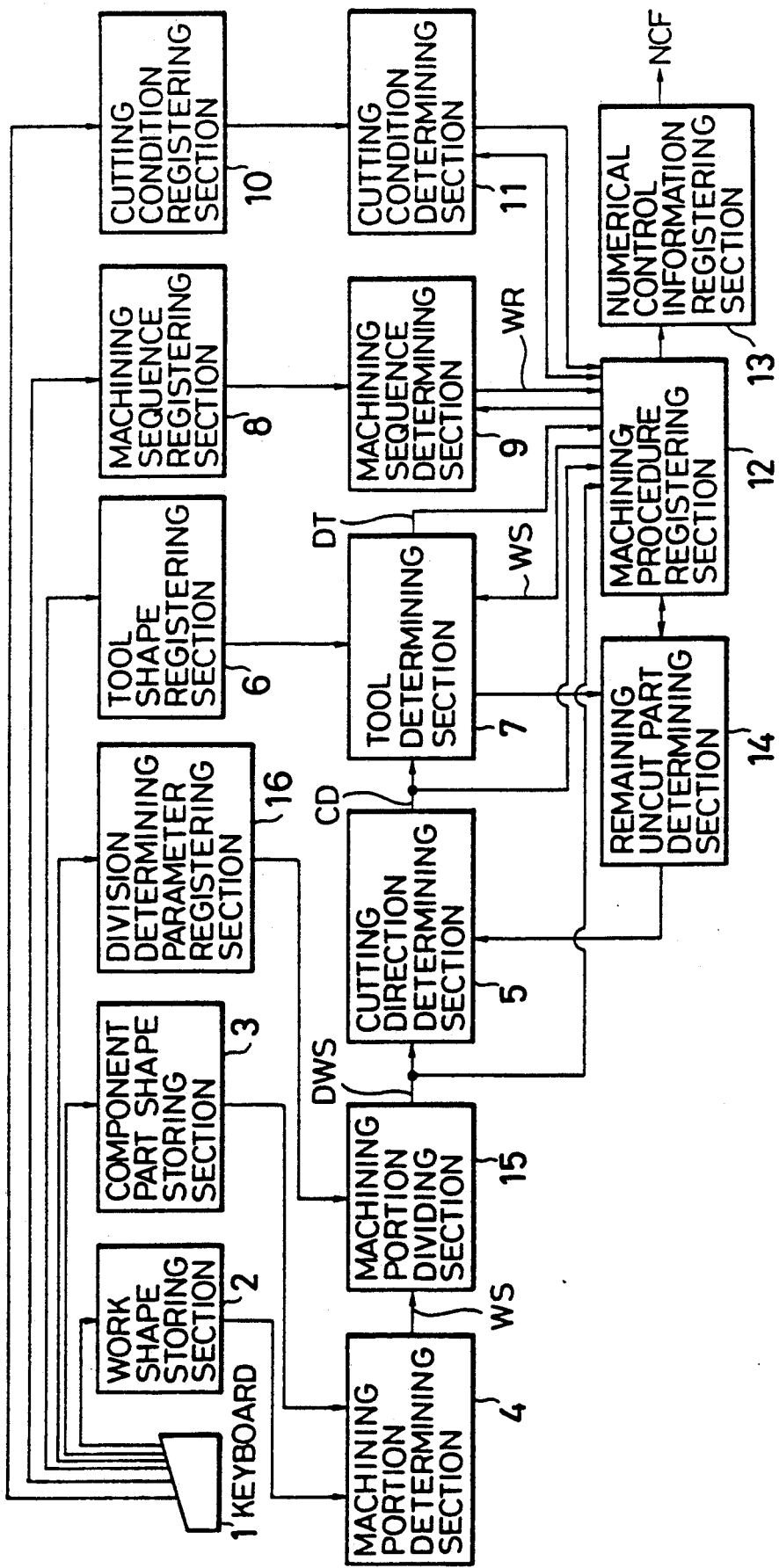
FIG. 14 is a block diagram showing the construction of another example of an apparatus to which the method according to the present invention is applicable.

When the determination is to be made as to whether the configuration part deviating from the division candidate point in the negative direction along the Z-axis can be machined using the forward direction cutting tool alone, or when a similar determination is made as to whether the machining is possible using the backward direction cutting tool alone, the determination may be made on the basis of, instead of the complementary angle of the tool angle, a parameter which has previously been set for use in the division determination. With this form of the method, the apparatus used may have the construction shown of the block diagram in FIG. 14. Specifically, the associated machining portion dividing section 15 divides a machining portion by reading a parameter from a division determining parameter registering section 16 in which the parameter is already registered through the associated keyboard 1.

Figure 5:
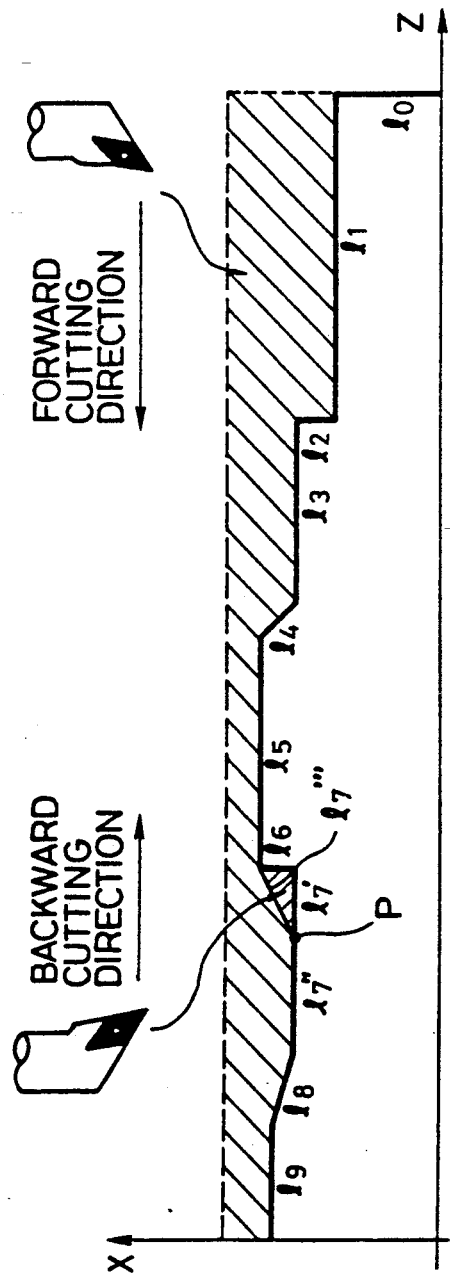

As has been described above, the method according to the present invention enables the optimum division of a portion of a workpiece to be subjected to outer diameter machining or inner diameter machining, the portion being divided into a sub-portion to be subjected to forward direction cutting and a sub-portion to be subjected to backward direction cutting. Thus, the adoption of the method of the present invention contrasts with the prior art in which, when part of the machining portion can remain uncut, as shown in FIG. 5, a configuration constituent is divided, in the middle thereof, into a part to be achieved by the forward direction cutting and a part to be achieved by the backward direction cutting, thereby leading to adverse influence on the machined surface. The method according to the present invention enables a forward direction cutting sub-portion and a backward direction cutting sub-portion to be divided at the optimum point shown in FIG. 6 or 13.

It should be understood that many modifications and adaptations of the invention will become apparent to those skilled in the art and the invention is intended to encompass such obvious modifications and changes in the scope of the claims appended hereto.

What is claimed is:

1. A method whereby the numerical control information preparing function determines the manner of machining, comprising the steps of:

causing the numerical control information preparing function to determine, on the basis of the input shape of a workpiece and on the basis of the input shape of a component part to be obtained from said workpiece, a portion of said workpiece which is to be subjected to outer diameter machining and a portion of said workpiece which is to be subjected to inner diameter machining, and causing the numerical control information preparing function to automatically divide, on the basis of the target configuration into which each of said portion to be subjected to said outer diameter machining and said portion to be subjected to inner diameter machining should be machined, each of said portions into a sub-portion to be subjected to forward cutting and a sub-portion to be subjected to backward cutting.

2. A method according to claim 1, wherein, in the automatically dividing step, a check is made, on the basis of the shape of a tool to be used in said forward cutting, the shape of a tool to be used in said backward cutting, and the target configuration into which each of said portions should be machined, as to whether any interference can occur between the shapes of said tools and the configurations of said portions, the automatically dividing step being executed on the basis of the result of said check.

3. A method according to claim 1, wherein the automatically dividing step is executed on the basis of the result of comparison between a predetermined tool angle and each surface angle of the target configuration of each of said portions to be machine.

4. A method of determining numerical control data to be used for machining a workpiece, said method comprising:

a step of receiving workpiece data denoting a shape of the workpiece and component part data denoting a shape of a component part to be machined from the workpiece;

a step of determining target configuration data based on the workpiece data and the component part data, the target configuration data denoting a target configuration of a portion of the workpiece to be machined;

a step of dividing the target configuration denoted by the target configuration data into first and second subportions to obtain new target configuration data; and, a step of preparing the numerical control data based on the new target configuration data such that the first subportion is subjected to forward direction cutting and the second subportion is subjected to backward direction cutting.

5. A method of determining numerical control data to be used for machining a workpiece, said method comprising:

a first step of receiving workpiece data denoting a shape of the workpiece and component part data denoting a shape of a component part to be machined from the workpiece;

a second step of obtaining original target configuration data based on the workpiece data and the component part data, the target configuration data denoting a target configuration of a portion of the workpiece to be machined, the target configuration being defined by plural surface segments of the to be machined component part;

a third step of dividing the target configuration denoted by the target configuration data into first and second subportions to obtain new target configuration data, the first subportion being directly adjacent to, in a forward direction, the second subportion;

a fourth step of determining whether the first portion of the target configuration can be entirely machined by forward direction cutting only, and, if the first portion of the target configuration cannot be entirely machined by forward direction cutting only, a fifth step of determining whether the first portion can be entirely machined by backward direction cutting only;

a sixth step of preparing the numerical control data based on the original target configuration data if it is determined in said fourth step that the first portion can be entirely machined by forward direction cutting only or if it is determined in said fifth step that the first portion cannot be entirely machined by backward direction cutting only; and a seventh step of preparing the numerical control data based on the new target configuration data if it is determined in said fifth step that the first portion can be entirely machined by backward direction cutting only.

6. A method as recited in claim 5, wherein, in said seventh step, the numerical control data is prepared such that the first portion is to be machined by backward direction cutting and the second portion is to be machined by forward direction cutting.

7. A method as recited in claim 6, wherein said third step includes:

a step of determining a division candidate point from among points between adjacent ones of the plural surface segments defining the target configuration; and, a step of setting the first subportion such that it extends in the forward direction from the division candidate point and the second subportion such that it extends in the backward direction from the division candidate point.

8. A method as recited in claim 7, wherein said fourth and fifth steps each include:

a step of comparing a tool angle with an angle of each of the surface segments defining the first subportion of the target configuration.

9. A method as recited in claim 6, wherein said fourth and fifth steps each include:

a step of comparing a tool angle with an angle of each of the surface segments defining the first subportion of the target configuration.

10. A method as recited in claim 5, wherein said third step includes:

a step of determining a division candidate point from among points between adjacent ones of the plural surface segments defining the target configuration; and, a step of setting the first subportion such that it extends in the forward direction from the division candidate point and the second subportion such that it extends in the backward direction from the division candidate point.

11. A method as recited in claim 10, wherein said fourth and fifth steps each include:

a step of comparing a tool angle with an angle of each of the surface segments defining the first subportion of the target configuration.

12. A method as recited in claim 5, wherein said fourth and fifth steps each include:

a step of comparing a tool angle with an angle of each of the surface segments defining the first subportion of the target configuration.

* * * * *